(No Model.)
H. C. DANIELS.
LANDMARK FOR INDICATING BOUNDARIES OR DIVISIONS.
No. 343,365. Patented June 8, 1886.
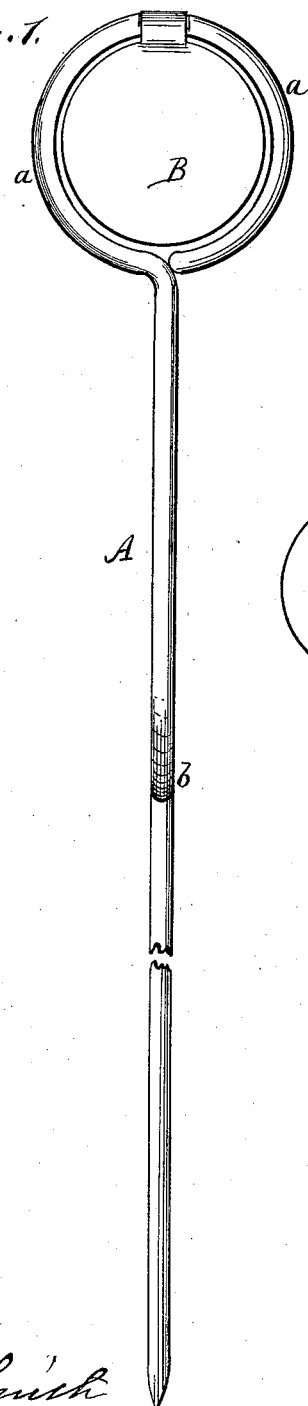
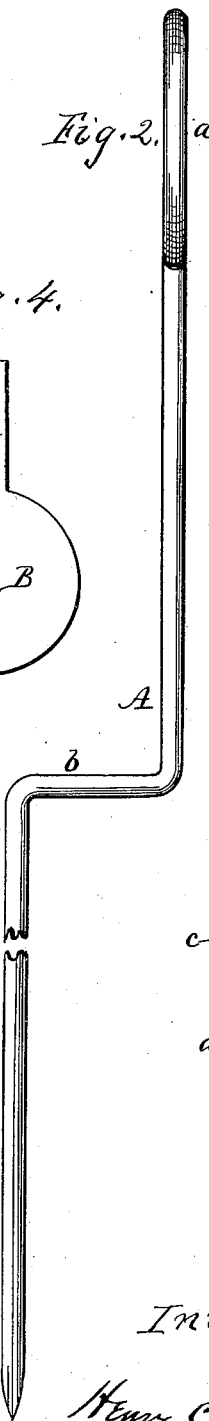
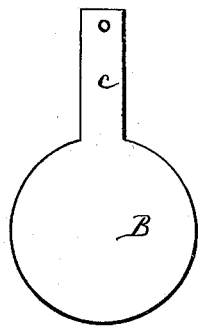
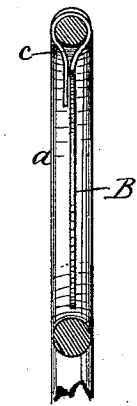
Attest.
A. Smith
R. F. Osgood
Inventor,
Henry C. Daniels

UNITED STATES PATENT OFFICE.

HENRY C. DANIELS, OF ROCHESTER, NEW YORK.

LAND-MARK FOR INDICATING BOUNDARIES OR DIVISIONS.

SPECIFICATION forming part of Letters Patent No. 343,365, dated June 8, 1886.

Application filed December 29, 1885. Serial No. 187,066. (No model.)

*To all whom it may concern:*

Be it known that I, HENRY C. DANIELS, of the city of Rochester, in the county of Monroe and State of New York, have invented a certain new and useful Improvement in Land-Marks; and I do hereby declare that the following is a full, clear, and exact description of the same, reference being had to the drawings accompanying this application.

My improvement relates to marks used to indicate boundaries or divisions, and is applicable to the uses of surveyors in locating lands, nurserymen in locating rows of trees, plants, &c.; also to indicate divisions between lots and ranges in cemeteries and other places, and many other similar purposes where boundary or indication marks are required; and is designed to furnish a cheap, simple, and durable substitute for the ordinary wooden stakes and tags now employed for those purposes.

My invention consists of a metallic rod or standard provided at the upper end with a loop, in which the metallic tag is suspended, so as to turn freely, and having a right-angled bend or offset in its length, which facilitates driving it into the ground, and which, when once driven into the ground, prevents the rod from turning, all as hereinafter described.

In the drawings, Figure 1 is a front elevation of the device. Fig. 2 is a side or edge elevation. Fig. 3 is a cross-section, enlarged, of the loop at the upper end of the rod, and a side view of the metallic tag hung therein. Fig. 4 is a face view of the blank which forms the tag.

The device is made of a metallic rod or bar, A, of suitable length, and made pointed at the bottom, so as to be easily driven into the ground. At the upper end is made a loop, *a*, to hold the tag, said loop being circular, square, triangular, elliptical, or of any other desired form. At a suitable point in its length the rod is also provided with a right-angled bend or offset, *b*, which serves the double purpose of a support on which to place the foot or to strike upon to drive the rod into the ground, and a resistance to prevent the rod from turning when it has been driven into the ground with the bend or offset in contact with the ground or below its surface.

B is the tag, made of metal or any suitable enduring material, and of a form corresponding with that of the loop at the top of the rod. It is preferably made of zinc, as that is non-corrosive. It has a projecting blank end, *c*, which is bent double or is coiled several times over the top of the loop, forming a hinge, the end being loose or riveted, as may be best. The top of the loop where the hinge rests is also countersunk or cut down, to give it a seat and prevent it from slipping sidewise.

The tag can be marked in any suitable manner to indicate the boundary, division, or any other subject it is desired to indicate—such as by stamping with steel dies, printing, stenciling, and in some instances by writing in acid on the zinc surface, which eats into the metal, and then varnishing or otherwise coating the surface.

The device above described is a very efficient substitute for the common wood stake and tag, as, when once in place, it will retain its position almost indefinitely, and will not decay.

One advantage of this invention is the loop at the upper end of the rod and the tag fitted therein to turn loosely. When at rest, the tag hangs vertically in the loop, and is shielded and protected by it. When it is desired to examine the tag it can be turned outward and upward, and the examination can be made without trouble.

Another advantage is in constructing the rod with the right-angled bend or offset, by which it can be easily driven into the ground, and by which, when in place, it is prevented from turning.

Having described my invention, what I claim as new, and desire to secure by Letters Patent, is—

The device herein described for indicating boundaries, divisions, &c., consisting of the rod provided with an offset in its length, and a loop at its top, and a tag hung freely in the loop, as and for the purpose specified.

In witness whereof I have hereunto signed my name in the presence of two subscribing witnesses.

HENRY C. DANIELS.

Witnesses:
R. F. OSGOOD,
P. A. COSTICH.